United States Patent
Skalecki et al.

(10) Patent No.: US 8,402,121 B2
(45) Date of Patent: Mar. 19, 2013

(54) METHOD OF NETWORK RECONFIGURATION IN OPTICAL TRANSPORT NETWORKS

(75) Inventors: Darek Skalecki, Ottawa (CA); Gerard L. Swinkels, Ottawa (CA); Evelyne Roch, Pontiac (CA)

(73) Assignee: Ciena Corporation, Hanover, MD (US)

( * ) Notice: Subject to any disclaimer, the term of this patent is extended or adjusted under 35 U.S.C. 154(b) by 76 days.

(21) Appl. No.: 13/172,993

(22) Filed: Jun. 30, 2011

(65) Prior Publication Data

US 2013/0007230 A1    Jan. 3, 2013

(51) Int. Cl.
*G06F 15/177* (2006.01)
(52) U.S. Cl. ........................................ 709/221
(58) Field of Classification Search .............. 709/221
See application file for complete search history.

(56) References Cited

U.S. PATENT DOCUMENTS

| | | | | |
|---|---|---|---|---|
| 6,591,290 B1 * | 7/2003 | Clarisse et al. | ............... | 709/205 |
| 6,785,843 B1 * | 8/2004 | McRae et al. | ............... | 714/23 |
| 7,321,932 B1 * | 1/2008 | Monga et al. | ............... | 709/227 |
| 8,125,925 B2 * | 2/2012 | Skalecki et al. | ............... | 370/254 |

OTHER PUBLICATIONS

ITU-T Recommendation G8080/Y1304, Architecture for the Automatically Switched Optical Network (ASON), Jun. 2006, pp. 1-104.
D. Caviglia, et al., RSVP-TE Signaling Extension for LSP Handover from the Management Plane to the Control Plane in a GMPLS-Enabled Transport Network, IETF RFC 5852, Apr. 2010, pp. 1-24.

* cited by examiner

*Primary Examiner* — Lance L Barry
(74) *Attorney, Agent, or Firm* — Kent Daniels; Daniels IP Services, Ltd.

(57) ABSTRACT

A method of reconfiguring a network having a transport plane for carrying subscriber traffic flows within end-to-end connections, a control plane for managing at least a portion of resources of the transport plane allocated to each connection, and a management plane for implementing management functions in the control plane and any resources of the transport plane that are not managed by the control plane. The method comprises installing an updated version of a control plane name space for a target node of the network. For each connection traversing the target node: a control plane to management plane migration is performed for removing connection state in the control plane associated with the connection, so as to transfer ownership of the connection from the control plane to the management plane; followed by a management plane to control plane migration for installing new connection state in the control plane associated with the connection, so as to transfer ownership of the connection from the management plant to the control plane, the new connection state being defined using the updated version of the control plane name space.

20 Claims, 8 Drawing Sheets

METHOD OF NETWORK RECONFIGURATION IN OPTICAL TRANSPORT NETWORKS

CROSS-REFERENCE TO RELATED APPLICATIONS

This is the first application filed in respect of the present invention.

FIELD OF THE INVENTION

The present application relates generally to management of optical communications networks, and more specifically, to methods of network reconfiguration in optical transport networks.

BACKGROUND OF THE INVENTION

FIG. 1 schematically illustrates the logical structure of an optical transport network in accordance with ITU-T recommendation G.8080/Y.1304, entitled Architecture for the Automatically Switched Optical Network (ASON), the entire content of which is incorporated herein by reference. As may be seen in FIG. 1, the network 2 is logically divided into a transport plane 4, a control plane 6 and a management plane 8.

The Transport Plane 4 comprises a plurality of switches 10 interconnected by Physical Interfaces (PIs) 12, and is responsible for transporting user data via end-to-end connections provisioned through the network. The Transport Plane typically utilizes a Transport Plane Name Space (TPNS) which defines the set of identifiers, tags and addresses used in the Transport Plane, for example to identify each of its elements and the connections provisioned within it (including, for example, switches 10, PIs 12 and connections)

The Control Plane 6 comprises a respective Optical Connection Controller (OCC) 14 for each switch 10 of the transport plane 4, and is responsible for resource and connection management within the transport plane 4. Each OCC 14 is connected to its corresponding switch 10 of the transport plane 4 via a Connection Controller Interface (CCI) 16. Within the Control Plane 6, the OCCs 14 are interconnected via Network to Network Interfaces (NNIs) 18, and provide a set of network resource and connection management functions. These functions may, for example, include: network topology discovery (resource discovery); address assignment; path computation, connection set-up/tear-down; connection protection/restoration; traffic engineering; and wavelength assignment. Other management functions can be implemented by the control plane 6, as desired. The Control Plane 6 typically utilizes a Control Plane Name Space (CPNS) which defines the set of identifiers, tags and addresses used, in the Control Plane, to identify elements of both the Control Plane and the Transport Plane. Typically, the Control Plane 6 introduces resource management concepts and entities that do not exist in the Transport Plane 4, and the CPNS is therefore required to be more extensive than the TPNS, in order to facilitate its expanded functionality. The additional Control Plane concepts and entities include, for example, network domains, areas, calls, and traffic management functions such as protection switching and restoration. Each CCI 16 implements a "binding", or mapping, between the CPNS and the TPNS, and thereby enables the respective OCC 14 to implement control plane functionality for its corresponding switch 10.

Typically a physical node of the network will incorporate both a Transport Plane switch 10 and its corresponding Control Plane OCC 14, although this is not essential. In some cases, a Transport Plane switch 10 and its corresponding Control Plane OCC 14 may be provided in separate physical machines. For example, the respective OCCs 14 of one or more switches 10 may be hosted on a server (not shown). Furthermore, in practical networks, some of the Transport Plane switches 10 may not have a corresponding Control Plane OCC 14. As may be appreciated, where a switch 10 does not have a corresponding Control Plane OCC 14, the switch is not control-plane enabled, and Control Plane functions cannot be used to control resources of that switch.

The Management Plane 8 is responsible for managing the Control Plane 6, and may also implement management functions in the Transport Plane 4, either directly or via the Control Plane 6. For example, in a typical network, the Management Plane 8 will directly control any switches 10 of the Transport Plane 4 that are not control-plane enabled. Responsibilities of the Management Plane 8 typically include Configuration Management of the Control Plane Resources, Routing Areas, Transport resource in Control Plane, and Policy. It may also provide Fault Management, Performance Management, Accounting and Security Management functions. The Management Plane 8 typically comprises a Network Management Entity 20 (such as, for example, a central management server) which is connected to an OCC 14 in the Control Plane 6 via a Network Management Interface for ASON Control Plane (NMI-A) 22 and to a switch 10 of the transport plane 4 via a Network Management Interface for the Transport Network (NMI-T) 24.

Client premised equipment (CE) 26, which may be a server or a router, for example, can send and receive packets that contain information for both the Transport Plane 4 and the Control Plane 6. For this purpose, the CE may be connected to a switch 10 of the Transport Plane 4 via a PI 12, and to its corresponding OCC 14 via a User Network Interface (UNI) 28.

IETF RFC 5852 describes a process for in-service migration of label switched paths (LSPs) from the Management Plane 8 to the Control Plane 6, which is referred to herein as an "MP-to-CP migration". The entire content of RFC 5852 is incorporated herein by reference. The MP-to-CP migration process enables the Control Plane 6 to acquire "ownership" of existing connections in the Transport Plane 4 that were previously being managed by the Management Plane 8. In this context, the acquisition of ownership of a connection means that the acquiring plane (in this case, the Control Plane 6) assumes responsibility for managing the connection. In the case of the MP-to-CP migration, this means that the Control Plane 6 assumes responsibility for managing the connection, and provides the full range of Control Plane functions in respect of that connection. As part of the migration, the Management Plane 8 relinquishes control of the connection, and so will only provide Management Plane functions in respect of that connection via the Control Plane 6. The MP-to-CP migration provides a useful mechanism by which a legacy network (comprising only a Transport Plane 4 and the Management Plane 8) can be upgraded to include a Control Plane 6.

RFC 5852 also describes an in-service CP-to-MP migration process, which is the reverse of the above-noted MP-to-CP migration. Thus, the CP-to-MP migration enables the Management Plane 8 to acquire ownership of existing connections in the Transport Plane 4 that were previously being managed by the Control Plane 6. This provides a convenient mechanism by which Management Plane functions in respect of a connection can be restored, in the event of a failed MP-to-CP migration.

For the purposes of the present application, the term "in-service" shall be understood to mean that traffic flows through the involved connection in the Transport Plane 4 are not disrupted.

For the purposes of the present application, the terms "CP-to-MP migration" and "MP-to-CP migration" shall be understood to include the in-service requirement.

For the purposes of the present application, the terms "call", "connection" and their cognates shall be interpreted as having the meanings as defined in relation to automatically switched optical networks (ASONs), pursuant to ITU-T recommendation G.8080/Y.1304.

Over the lifetime of a network, it may be necessary to perforin in-service network reconfigurations, such as: inserting/removing nodes in the network and into existing connections in particular; merging or splitting network domains or areas; extending or reducing the control plane's span of control of a connection (for example, changing the number of control-plane-enabled switches traversed by the connection); and changing from one Control Plane technology to another.

Different types of network reconfiguration may require respective different specific procedures. For example, FIG. 2 illustrates a known procedure for changing the path of an existing connection, for example to insert or remove a node from the connection, without significantly disrupting Transport Plane traffic flow through the connection. Referring to FIG. 2, in a first step (S2), an alternate end-to-end path through the network is computed for the connection, and an alternate connection set up along that path (at step S4). Once the alternate path has been set up, the end-nodes can be controlled (at step S6) to switch the Transport Plane traffic from the original connection to the alternate connection. The original connection can then be torn down (at step S8), without disrupting the Transport Plane traffic. In some embodiments, the alternate end-to-end path can be set up to traverse substantially the same path as the existing connection, and including (or omitting) the node to be added (or removed). In this case, the network reconfiguration is completed upon teardown of the original connection at step S8. In other embodiments, it may be desirable to set up a new path that differs from the alternate path computed at step S2. In this case, the new path for the connection can be computed (or otherwise defined) at step S10, for example to traverse substantially the same path as the existing connection, and including a new node to be added to the connection path, or to bypass a node being removed from the connection path. A new connection can then be set up (at step S12) along the new path, and the end-nodes are controlled (at step S14) to switch the Transport Plane traffic from the alternate connection to the new connection. Finally, the alternate connection may be torn down (at S16) to release the network resources allocated to it.

Apart from the addition or deletion of individual nodes as described above, procedures for other types of network reconfigurations have not been yet been developed. As networks grow larger, however, it is expected that a time will come when such networks will need to be split into two or more domains. As network operating companies merge, partner or combine, merging of networks (or network domains) may become necessary. As standard-based connection-oriented Control Planes like GMPLS mature, a need may arise to migrate from pre-standard or proprietary Control Plane technology (such as OSRP) to the standardized Control Planes (eg: GMPLS). All of these operations comprise network reconfigurations and may need to be performed while not impacting existing Transport Plane connection traffic.

While the specific network reconfiguration procedures are expected to differ, in a standard-based connection-oriented Control Plane a typical network reconfiguration will invariably require changes in the Control Plane Name Space (CPNS). For example, when a new node is added to the network, or when the Control Plane 6 is extended to a network node that was previously not under control of the Control Plane 6, the CPNS must be updated to include at least the identifier and address of the new node in the Control Plane, so that the new node can participate in Control Plane signalling and functionality associated with any connections that traverse the new node. Similarly, when a Control Plane is split into two or more domains (or, conversely, when two or more domains are merged), the CPNS of the (or each) original domain must be updated to reflect the split (or merge).

The invention proposes a single and simple mechanism that can be incorporated into an in-service network reconfiguration procedure to take care of the changes to the Control Plane states for the connections, where such states are very much dependent on the Control Plane IDs, tags and/or addresses for the nodes/links/domains/areas/etc affected by the reconfiguration.

Techniques that enable in-service network reconfigurations involving changes in the Control Plane Name Space remain highly desirable.

SUMMARY OF THE INVENTION

An aspect of the present invention provides a method of reconfiguring a network having a Transport Plane for carrying subscriber traffic flows within end-to-end connections, a Control Plane for managing at least a portion of resources of the Transport Plane allocated to each connection, and a Management Plane for implementing management functions in the Control Plane and any resources of the Transport Plane that are not managed by the Control Plane. The method comprises installing an updated version of a Control Plane Name Space for at least one target node of the network. For each connection traversing the target node: a Control Plane to Management Plane migration is performed for removing connection state in the Control Plane associated with the connection, so as to transfer ownership of the connection from the Control Plane to the Management Plane; followed by a Management Plane to Control Plane migration for installing new connection state in the control plane associated with the connection, so as to transfer ownership of the connection from the Management Plane to the Control Plane, the new connection state being defined using the updated version of the Control Plane Name Space.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides techniques for in-service network reconfigurations involving changes in the Control Plane Name Space.

Figure 3A:
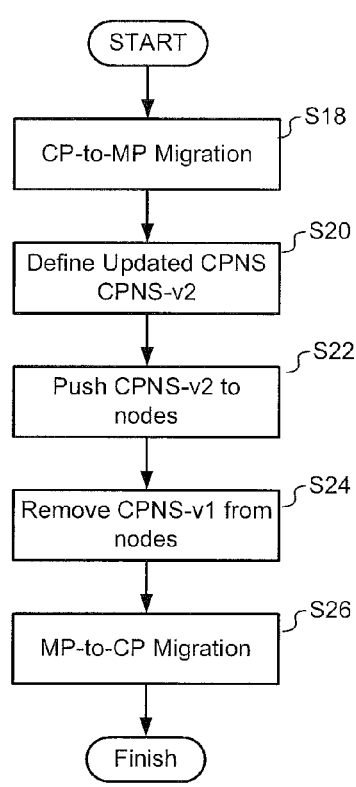
FIGS. 3A-3C are flow charts showing principle elements in a network reconfiguration process in accordance with representative embodiments of the present invention.

In very general terms, network reconfiguration processes in accordance with the present invention utilize a pair of name spaces in the Control Plane, and implement CP-to-MP and MP-to-CP migrations. FIG. 3A is a flow-chart illustrating a representative network reconfiguration process in accordance with the present invention.

Figure 1:
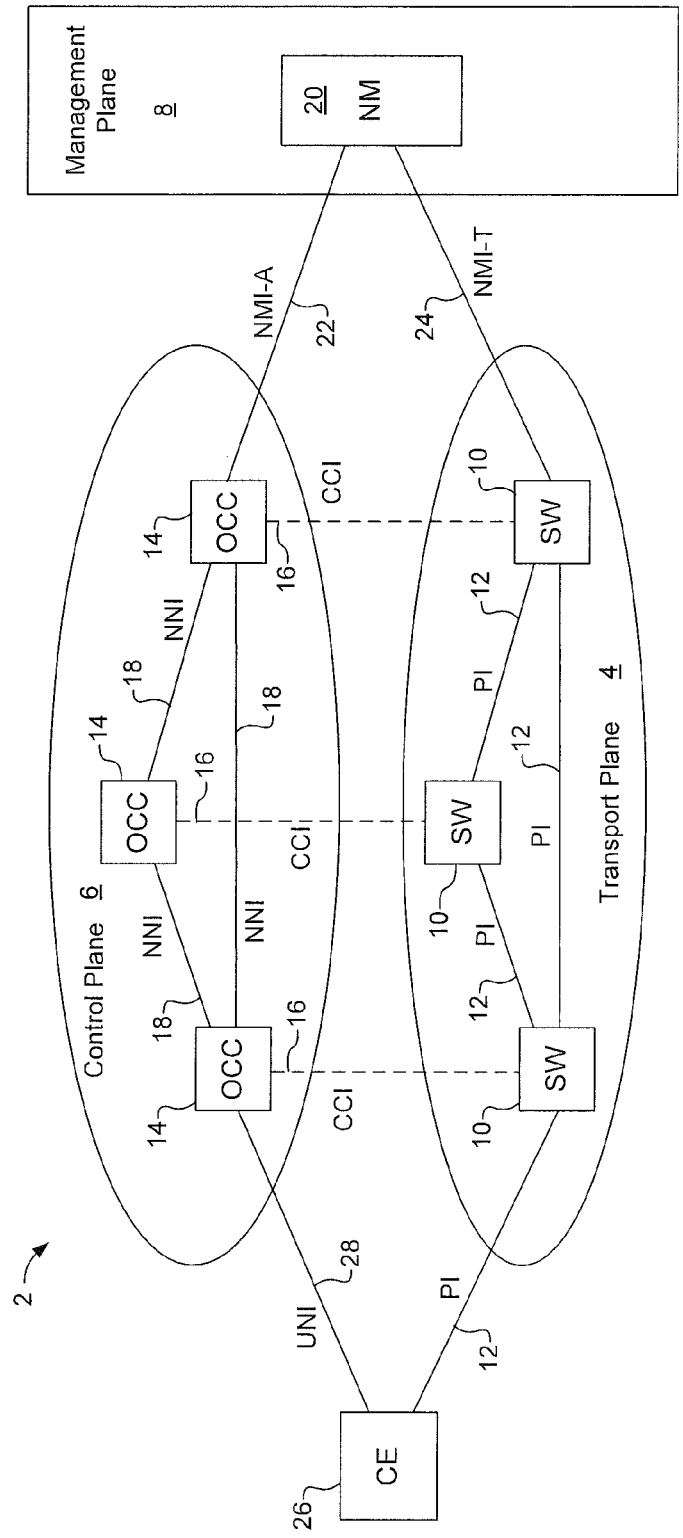
FIG. 1 is a block diagram schematically illustrating the logical structure of an Automatically Switched Optical Network known in the prior art.
Figure 2:
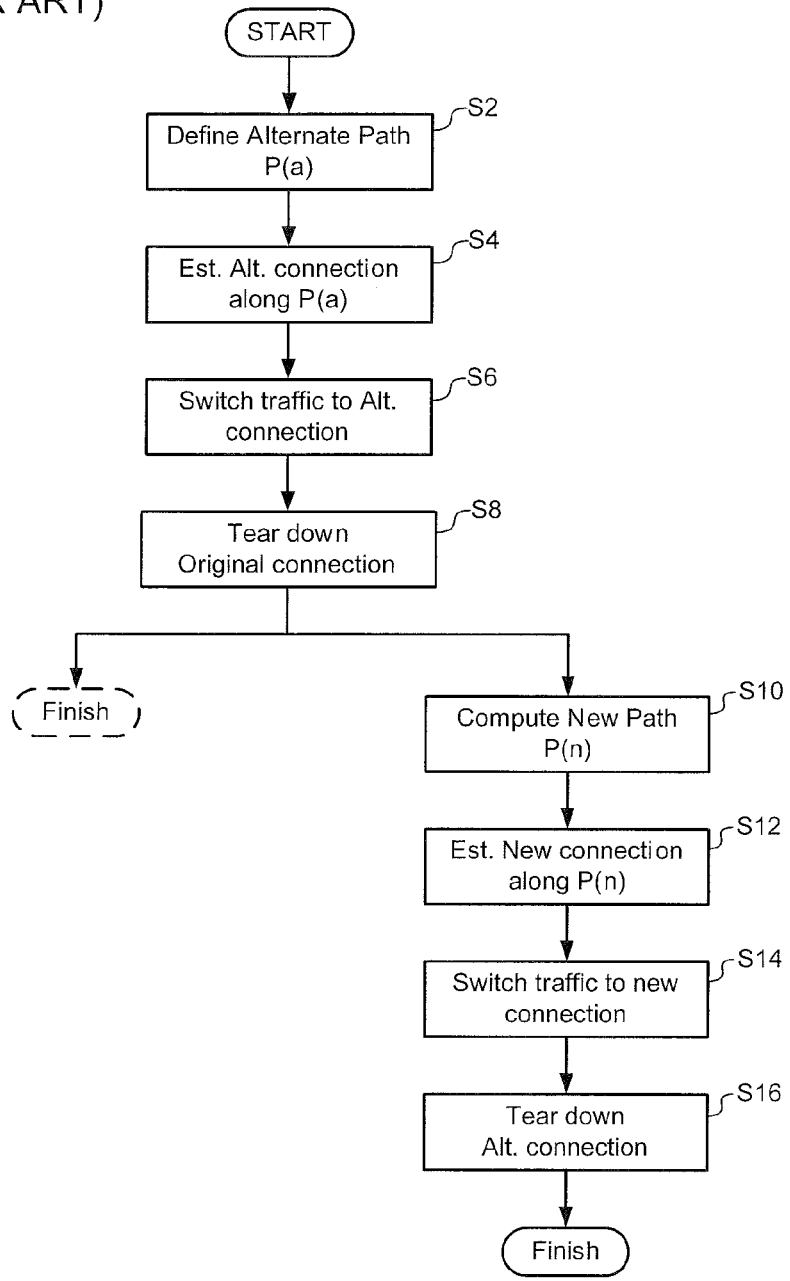
FIG. 2 is a flow chart showing a known network reconfiguration process for inserting a node into an existing connection.

In the example of FIG. 3A, it is assumed that the network is operating with a first version of the Control Plane Name Space (referred to as CPNS-v1). At a first step (at S18), a CP-to-MP migration is executed to remove existing Control Plane connection state (defined under the original CPNS-v1) and transfer ownership of all the corresponding Transport Plane connections to the Management Plane 8. In some embodiments, this CP-to-MP migration may follow a standard migration process, such as, for example, as defined under RFC 5852. Following completion of the CP-to-MP migration at S18 for all connections, a new version of the Control Plane Name Space (referred to as CPNS-v2) is defined (at step S20), and, at step S22, either pushed to nodes of the network or, equivalently, pushed to a server (not shown) configured to host a respective Optical Connection Controller (OCC) 14 for each involved node. Upon completion of this step, each OCC 14 (FIG. 1) has both the original CPNS-v1 and the new CPNS-v2 stored in memory.

At a next step the original CPNS-v1 is removed (at S24), so that each OCC 14 has only the new CPNS-v2 stored in memory. A subsequent MP-to-CP migration is then executed (at S26) to establish new Control Plane connection state (using the new CPNS-v2) for all of the Transport Plane connections, and so transfer ownership of the Transport Plane connections back to the Control Plane 6. In some embodiments, the MP-to-CP migration may follow a standard migration process, such as, for example, as defined under RFC 5852.

Figure 3B:
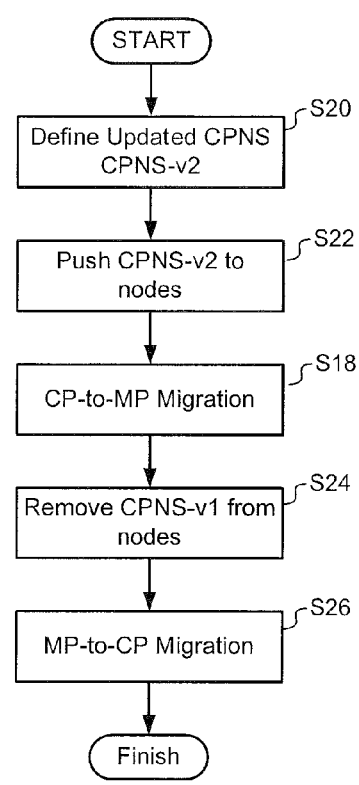

If desired, the order or operations may be adjusted, so that, for example, the CP-to-MP migration (at step S18) is performed after the new CPNS-v2 is pushed to nodes of the network (at step S22). This alternative is illustrated in FIG. 3B. In some embodiments, the steps of pushing the new CPNS-v2 to network nodes (at S22) may be merged with removal of the old CPNS-v1 (at S24), if desired.

Figure 3C:
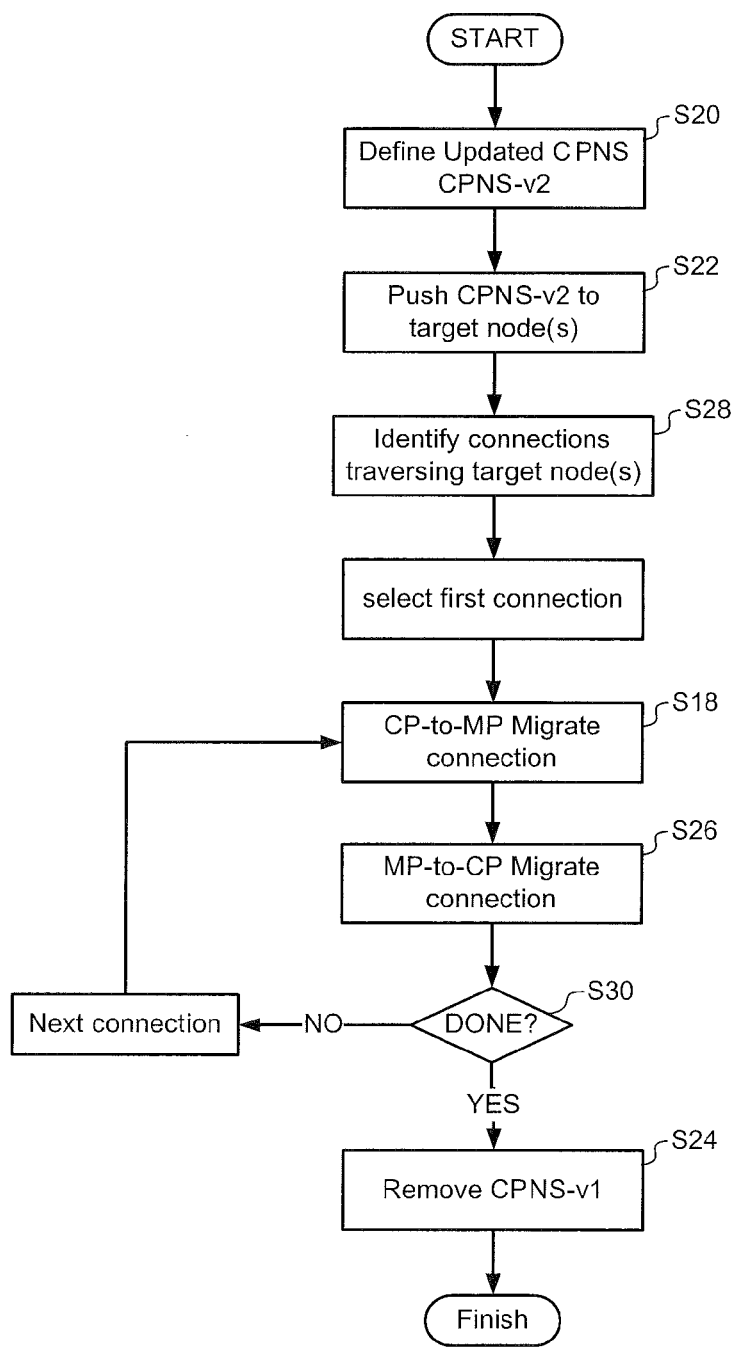

FIG. 3C illustrates a further alternative method, in which the new Control Plane Name Space CPNS-v2 is pushed (at step S22) to a set of one or more target nodes in the network, which may be selected according to any desired criteria. Then, the connections traversing the (or each) target node are identified (at step S28), and processed, one connection at a time, using back-to-back CP-to-MP and MP-to-CP migration processes (at steps S18 and S26) to reconfigure the network. When all of the identified connections have been processed (at step S30), the original Control Plane Name Space (CPNS-v1) can be removed (at S24).

As may be appreciated, the process described above with reference to FIGS. 3A-3C, has the effect of replacing a current version of Control Plane Name Space, CPNS-v1, with an updated (or new) Control Plane Name Space, CPNS-v2. Using the migration processes as set out in RFC 5852, for example, enables this transition to be accomplished in-service; that is, without disrupting traffic flows in the Transport Plane 4. In fact, the above-described reconfiguration process affects only the connection state within the Control Plane 6, and bindings implemented in the CCIs 16 between the Transport Plane Name Space and the involved versions of the Control Plane Name Space. As a result, resource allocations and Transport Plane connection state associated with a Transport Plane connection would not be affected at all, beyond the fact that Control Plane management functions are not available during the time that the Management Plane 8 has ownership of that Transport Plane connection.

In the context of the present disclosure, the process of installing an updated (or new) Control Plane Name Space CPNS-v2, shall be understood to encompass any desired change in the Control Plane Name Space, including but not limited to changing identifiers, tags, and/or addresses associated with nodes, links, calls or connections within an existing Control Plane; deploying an Control Plane in part or all of an existing network domain that previously was not control plane-enabled; and replacing a legacy control plane technology or protocol with a new control plane technology or protocol. The scope of the change, in terms of the number of nodes on which the change is implemented, can be as low as a single node, or may be as large as the entire network, as desired. An easily understood example of changing the Control Plane Name Space involves replacing an existing (perhaps proprietary) Control Plane Name Space with a new (possibly standards based) Control Plane Name Space, across all or part of a network domain. However, many other scenarios are possible.

For example, the methods of FIGS. 3A-3C may be used to add a single node to the Control Plane. In this case, the original version of the Control Plane Name Space, CPNS-v1, on the target node is in fact "null" (or empty), because at the start of the process the node is not Control Plane enabled, and so does not have a presence in the Control Plane. The updated (or new) Control Plane Name Space, CPNS-v2, pushed to the target node (FIG. 3 at S22) may simply be an extension of the name space currently in use in the rest of the Control Plane 8, in which case the updated name space change does not need to be pushed to any of the other nodes in the Control Plane. Finally, the CP-to-MP/MP-to-CP migration process (FIG. 3 at S18 and S26) needs to be executed only for those connections that traverse the target node, as described above with reference to FIG. 3C.

Those of ordinary skill in the art will clearly recognise that the technique described above for adding a single node to the Control Plane can be readily reversed, to thereby remove a single node from the Control Plane. Furthermore, the ordinarily skilled artisan will readily understand that these techniques can be extended across any desired number of nodes in the network, to thereby deploy (or remove) a Control Plane spanning any desired portion of a network domain, or indeed the entire network domain if desired.

Figure 4A:
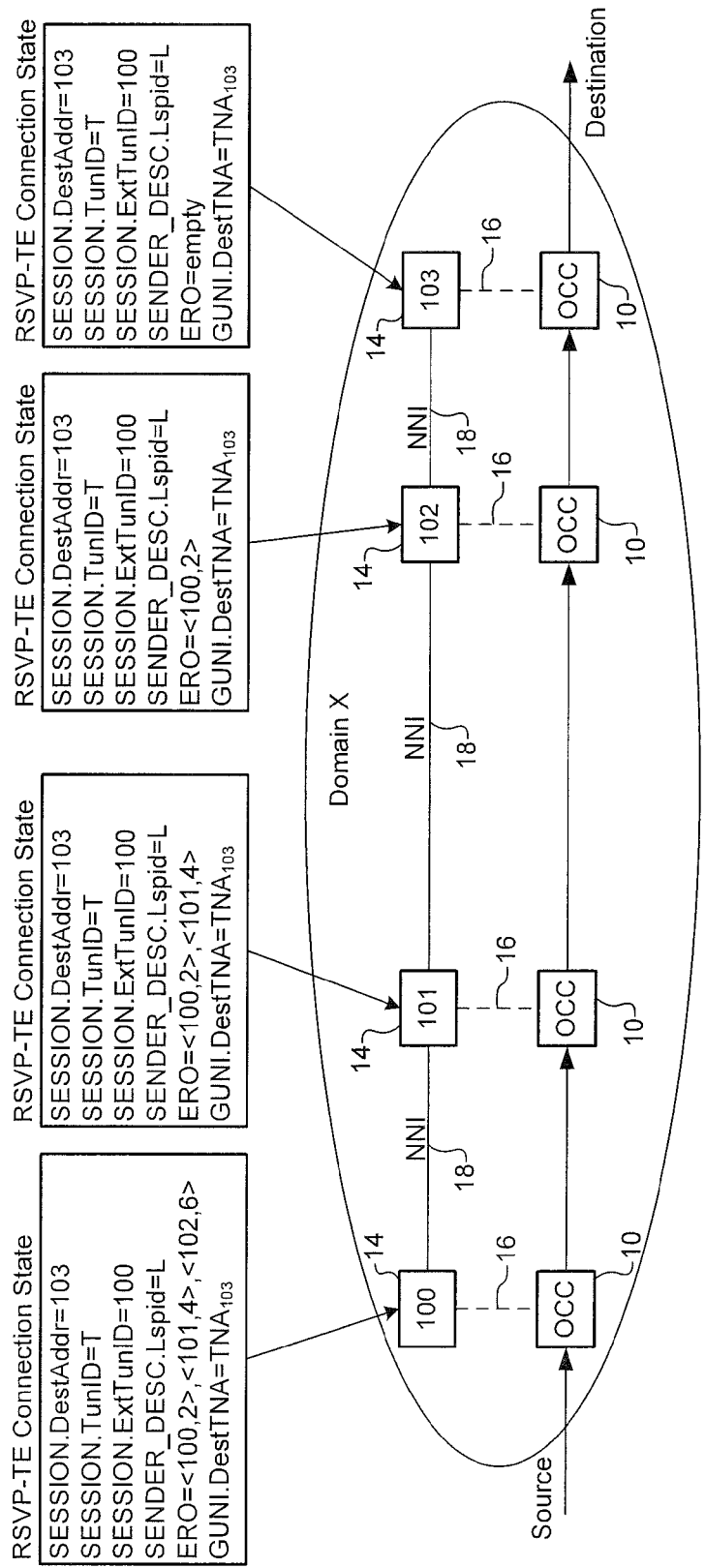
FIGS. 4A-4E schematically illustrate a representative network reconfiguration utilizing the method of FIGS. 3A-3C.

FIGS. 4A-4E illustrate an embodiment in which the method of FIG. 3 is used to reconfigure a network domain X, in which the reconfiguration comprises splitting the domain into a pair of domains X.1 and X.2. Referring to FIG. 4A, in an initial state of the network, the domain X comprises four nodes, each of which includes a Transport Plane switch 10 and a Control Plane OCC 14 providing Control Plane functions for a Transport Plane connection that extends from a Source to a Destination. Within domain X, each OCC has a node address (100, 102, 102, 103) and installed RSVP-TE connection state which enables the Control Plane to implement connection routing and management functions for the Transport Plane connection. The RSVP-TE connection state shown in FIG. 4A is defined using the original OCC addresses, port assignments, and tunnel identifiers, all of which are defined using the original CPNS-v1.

Figure 4B:
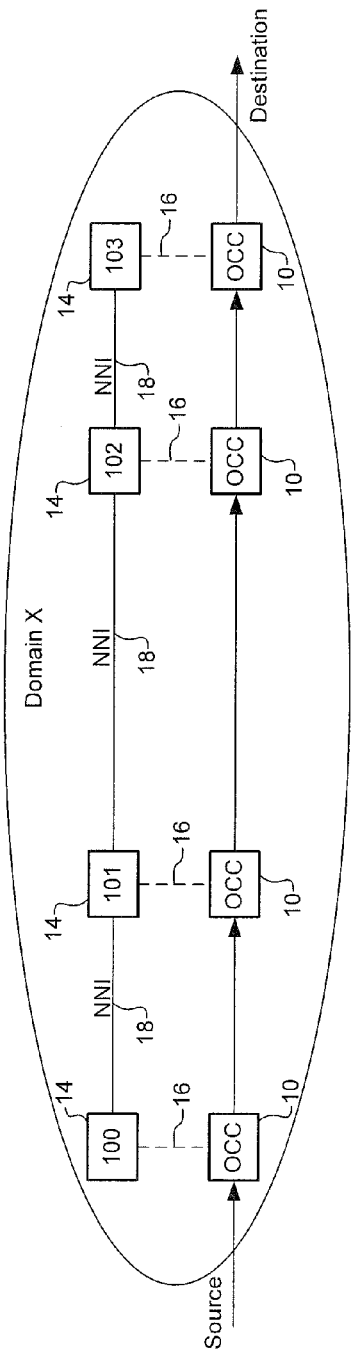

FIG. 4B illustrates the state of the network following the CP-to-MP migration, in which the RSVP-TE connection state has been removed, and ownership of the Transport Plane connection transferred to the Management Plane.

Figure 4C:
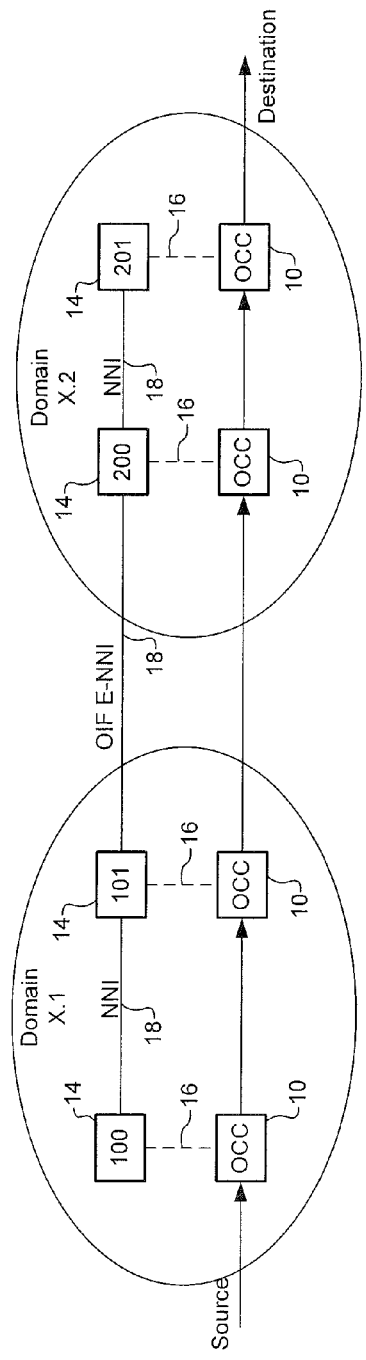
Figure 4D:
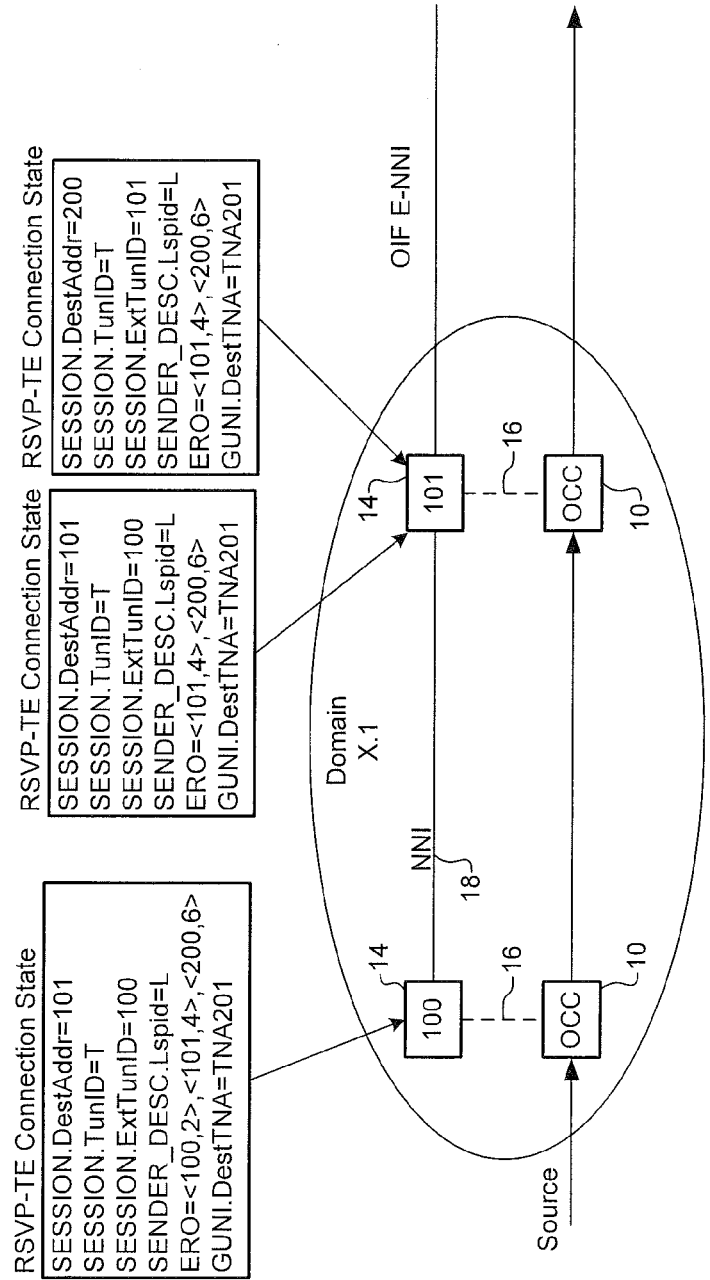
Figure 4E:
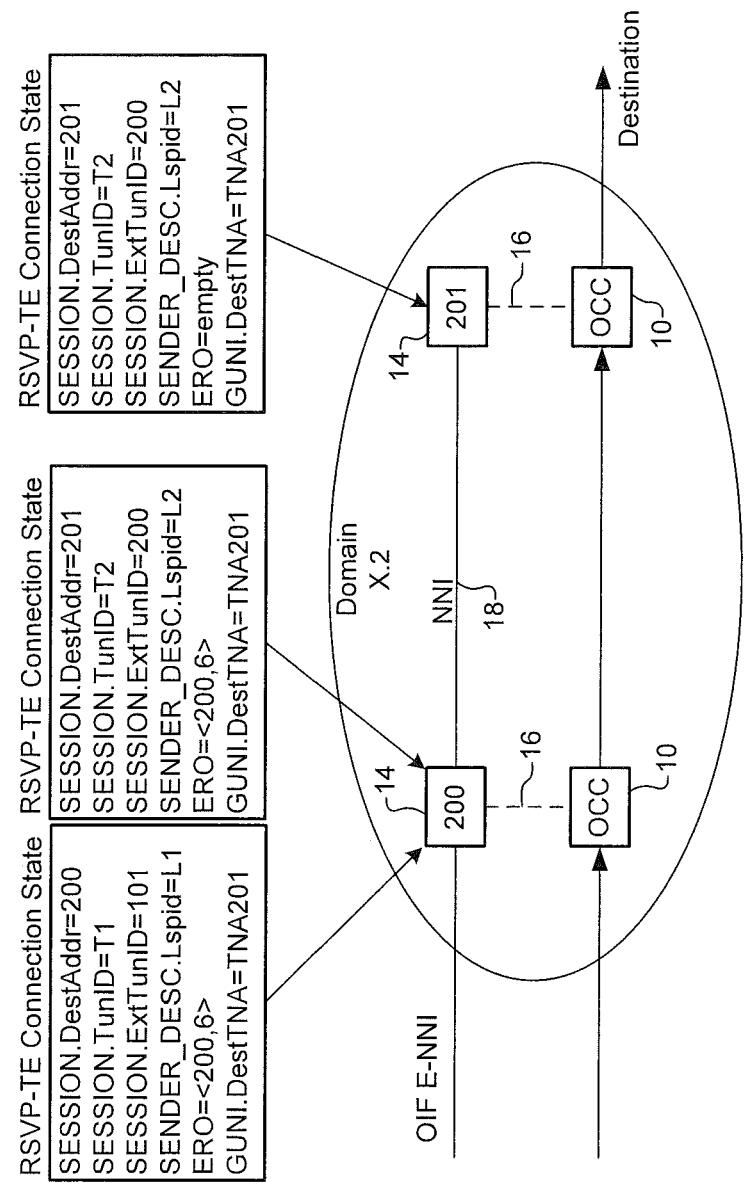

FIG. 4C illustrates the state of the network following implementation of the new Control Plane Name Space (CPNS-v2), which in this case includes splitting the original domain into two new domains (labelled as a domain X.1 and X.2); assigning new addresses (200 and 201) to two of the OCCs, and modifying the NM 18 that originally connected OCCs 102 and 103 into an OIF E-NNI which provides a Control Plane interconnection between the two domains. Subsequent execution of the MP-to-CP migration causes the installation of new RSVP-TE connection state in each of the OCCs, which reflects the updated Control Plane Name Space (CPNS-v2) and re-implements Control Plane functions in respect of the Transport Plane connection. The state of the network following this operation is illustrated in FIGS. 4D and 4E, in which it may be seen that the node addresses, and tunnel identifiers reflect the new Control Plane Name Space.

Those of ordinary skill in the art will readily understand that the techniques described above with reference to FIGS. 3 and 4 can be modified to split a network domain in to any desired number of smaller domains, or to merge two or more domains into a single larger domain, or perform any other network reconfigurations, as desired.

Those of ordinary skill in the art will readily understand that the techniques described above with reference to FIGS. 3 and 4 can be implemented by means of software instructions stored on a non-transitory computer readable storage medium for execution by a suitable processor such as, for example, may be provided in the management entity 20.

The embodiments of the invention described above are intended to be illustrative only. The scope of the invention is therefore intended to be limited solely by the scope of the appended claims.

We claim:

1. A method of reconfiguring a network having a transport plane for carrying subscriber traffic flows within end-to-end connections, a control plane for managing at least a portion of resources of the transport plane allocated to the connections, and a management plane implementing management functions for the control plane and any resources of the transport plane that are not managed by the control plane, the method comprising:
   installing an updated control plane name space for at least one target node of the network; and
   for each connection traversing the at least one target node:
      performing a control plane to management plane migration for removing connection state in the control plane associated with the connection, so as to transfer ownership of the connection from the control plane to the management plane; and
      performing a management plane to control plane migration for installing new connection state in the control plane associated with the connection, so as to transfer ownership of the connection from the management plane to the control plane, the new connection state being defined using the updated control plane name space.

2. The method as claimed in claim 1, wherein the step of installing an updated control plane name space comprises steps of:
   defining the updated control plane name space; and
   pushing the updated control plane name space to either the at least one target node or a server hosting a respective Optical Connection Controller (OCC) for each target node.

3. The method as claimed in claim 1, wherein the step of installing an updated control plane name space is performed after the step of performing the control plane to management plane migration, and before the step of performing the management plane to control plane migration.

4. The method as claimed in claim 1, wherein an initial control plane name space installed for the at least one target node is null or empty, and wherein the network is reconfigured by increasing a span of control of the control plane by enabling the control plane to manage resources of the transport plane associated with the at least one target node.

5. The method as claimed in claim 1, wherein the updated control plane name space installed for the at least one target node is null or empty, and wherein the network is reconfigured by decreasing a span of control of the control plane by removing resources of the transport plane associated with the at least one target node from management by the control plane.

6. The method as claimed in claim 1, wherein the at least one target node comprises all of the nodes within a selected portion of the network.

7. The method as claimed in claim 6, wherein the network is reconfigured by replacing an initial control plane name space with the updated control plane name space throughout the selected portion of the network.

8. The method as claimed in claim 6, wherein the selected portion of the network comprises a network domain having an initial control plane name space.

9. The method as claimed in claim 8, wherein the updated control plane name space installed for a first set of target nodes within the domain differs from the updated control plane name space installed for a second set of target nodes within the domain, such that the network is reconfigured by splitting the network domain into two or more domains.

10. The method as claimed in claim 6, wherein the selected portion of the network comprises two or more network domains, each network domain having a respective initial control plane name space.

11. The method as claimed in claim 10, wherein a common updated control plane name space is installed for target nodes of each of the two or more network domains, such that the network is reconfigured by merging the two or more network domains into one domain.

12. A non-transitory computer readable storage medium comprising software instructions for controlling a processor to execute a method of reconfiguring a network having a transport plane for carrying subscriber traffic flows within end-to-end connections, a control plane for managing at least a portion of resources of the transport plane allocated to the connections, and a management plane implementing management functions for the control plane and any resources of the transport plane that are not managed by the control plane, the method comprising:
   installing an updated control plane name space for at least one target node of the network; and
   for each connection traversing the at least one target node:
      performing a control plane to management plane migration for removing connection state in the control plane associated with the connection, so as to transfer ownership of the connection from the control plane to the management plane; and performing a management plane to control plane migration for installing new connection state in the control plane associated with the connection, so as to transfer ownership of the connection from the management plant to the control plane, the new connection state being defined using the updated control plane name space.

13. The storage medium as claimed in claim 12, wherein an initial control plane name space installed for the at least one target node is null or empty, and wherein the network is reconfigured by increasing a span of control of the control plane by enabling the control plane to manage resources of the transport plane associated with the at least one target node.

14. The storage medium as claimed in claim 12, wherein the updated control plane name space installed for the at least one target node is null or empty, and wherein the network is reconfigured by decreasing a span of control of the control plane by removing resources of the transport plane associated with the at least one target node from management by the control plane.

15. The storage medium as claimed in claim 12, wherein the at least one target node comprises all of the nodes within a selected portion of the network.

16. The storage medium as claimed in claim 15, wherein the network is reconfigured by replacing an initial control plane name space with the updated control plane name space throughout the selected portion of the network.

17. The storage medium as claimed in claim 15, wherein the selected portion of the network comprises a network domain having an initial control plane name space.

18. The storage medium as claimed in claim 17, wherein the updated control plane name space installed for a first set of target nodes within the domain differs from the updated control plane name space installed for a second set of target nodes within the domain, such that the network is reconfigured by splitting the network domain into two or more domains.

19. The storage medium as claimed in claim 15, wherein the selected portion of the network comprises two or more network domains, each network domain having a respective initial control plane name space.

20. The storage medium as claimed in claim 19, wherein a common updated control plane name space is installed for target nodes of each of the two or more network domains, such that the network is reconfigured by merging the two or more network domains into one domain.

* * * * *